United States Patent
Hirano et al.

(10) Patent No.: US 12,098,999 B2
(45) Date of Patent: Sep. 24, 2024

(54) ELECTROMAGNETIC WAVE SENSOR COVER

(71) Applicant: TOYODA GOSEI CO., LTD., Kiyosu (JP)

(72) Inventors: Risa Hirano, Kiyosu (JP); Koji Okumura, Kiyosu (JP); Koji Fukagawa, Kiyosu (JP); Hiroaki Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 299 days.

(21) Appl. No.: 17/677,486

(22) Filed: Feb. 22, 2022

(65) Prior Publication Data
US 2022/0268605 A1   Aug. 25, 2022

(30) Foreign Application Priority Data
Feb. 24, 2021   (JP) .................. 2021-027725

(51) Int. Cl.
  *G01N 21/15*   (2006.01)
  *G01D 11/26*   (2006.01)
  (Continued)

(52) U.S. Cl.
  CPC ............ *G01N 21/15* (2013.01); *G01D 11/26* (2013.01); *G01N 21/359* (2013.01); *G01N 2021/158* (2013.01); *G01S 7/4813* (2013.01)

(58) Field of Classification Search
  CPC .......... G01N 21/15; G01N 21/359; G01N 2021/158; G01D 11/26; G01S 7/4813;
  (Continued)

(56) References Cited

U.S. PATENT DOCUMENTS

2012/0097415 A1   4/2012   Reinert et al.
2015/0228923 A1   8/2015   Schicktanz et al.
(Continued)

FOREIGN PATENT DOCUMENTS

JP   2021-056313 A   4/2021
WO   2016-012579 A1   1/2016
(Continued)

OTHER PUBLICATIONS

Office Action dated Nov. 22, 2023 issued for corresponding Korean Patent Application No. 10-2022-0022896 (and English machine translation).

*Primary Examiner* — Peter J Macchiarolo
*Assistant Examiner* — Anthony W Megna Fuentes
(74) *Attorney, Agent, or Firm* — Posz Law Group, PLC (57) ABSTRACT

An electromagnetic wave sensor cover, applied to an electromagnetic wave sensor including a transmission unit and a reception unit, includes a cover main body portion that covers the transmission unit and the reception unit. The cover main body portion includes: a base material formed of a resin material and having a transmission property of an electromagnetic wave from the transmission unit; an undercoat layer formed on a rear surface of the base material and having the transmission property of the electromagnetic wave from the transmission unit; a heater portion that is formed of copper in a band shape on a rear surface of the undercoat layer, is configured to generate heat by being energized, and adheres to the base material via the undercoat layer; and a $SiO_2$ coating film having the transmission property of the electromagnetic wave from the transmission unit and covering the heater portion.

3 Claims, 4 Drawing Sheets

(51) Int. Cl.
  *G01N 21/359* (2014.01)
  *G01S 7/481* (2006.01)
  *B60R 11/00* (2006.01)
  *C09D 1/00* (2006.01)
  *G01S 7/497* (2006.01)
  *H01Q 1/02* (2006.01)
  *H05B 3/00* (2006.01)
  *H05B 3/02* (2006.01)
  *H05B 3/18* (2006.01)

(58) Field of Classification Search
  CPC . G01S 7/497; G01S 2007/4977; B60R 11/00; B60R 2011/0094; H05B 3/0014; H05B 3/02; H05B 3/18; C09D 1/00; H01Q 1/02
  See application file for complete search history.

(56) References Cited

U.S. PATENT DOCUMENTS

2019/0232886 A1* 8/2019 Okumura ................. H01Q 1/02
2021/0096221 A1   4/2021 Okumura et al.

FOREIGN PATENT DOCUMENTS

WO   WO-2019058834 A1 *  3/2019 ............. B60R 13/04
WO   WO-2020213309 A1 * 10/2020 ............. B60R 13/00

\* cited by examiner

ELECTROMAGNETIC WAVE SENSOR COVER

CROSS-REFERENCE TO RELATED APPLICATIONS

This application is based upon and claims the benefit of priority from prior Japanese patent application No. 2021-027725 filed on Feb. 24, 2021, the entire contents of which are incorporated herein by reference.

BACKGROUND

1. Field of the Invention

The present invention relates to an electromagnetic wave sensor cover.

2. Description of the Related Art

A near-infrared sensor provided in a vehicle includes a transmission unit and a reception unit for near-infrared rays. The transmission unit and the reception unit are covered with a cover main body portion of a near-infrared sensor cover from a front side in a transmission direction of electromagnetic waves from the transmission unit.

In the near-infrared sensor, the near-infrared rays are transmitted from the transmission unit to the outside of the vehicle. The transmitted near-infrared rays transmit through the cover main body portion, and then are reflected by hitting an object including a preceding vehicle, a pedestrian, and the like outside the vehicle. The reflected near-infrared rays transmit through the cover main body portion and are received by the reception unit. Based on the transmitted near-infrared rays and the received near-infrared rays, the near-infrared sensor recognizes the object outside the vehicle and detects a distance, a relative speed, and the like, between the vehicle and the object.

In the near-infrared sensor, when snow adheres, the recognition and the detection are temporarily stopped. This is because the adhering snow hinders transmission of the near-infrared rays. However, with spread of the near-infrared sensors, there is a demand fix the recognition and the detection described above even during snowfall.

Therefore, various near-infrared sensor covers having a snow melting function have been considered. For example, a near-infrared sensor cover in which a cover main body portion includes a base material, a heater portion, and a protective film is known. The base material is formed of a resin material and has a transmission property of the near-infrared rays. The heater portion is formed of copper in a band shape on a rear surface of the base material in the transmission direction, and generates heat by being energized. The protective film covers the heater portion from a rear side in the transmission direction. The protective film is formed of a resin material, and protects and insulates the heater portion.

According to the near-infrared sensor cover, the heater portion generates heat by being energized. Therefore, even when snow adheres to the near-infrared sensor cover, the snow is melted by the heat generated by the heater portion, and attenuation of the near-infrared rays caused by the adhesion of the snow can be prevented.

For example, WO2016/012579 discloses a near-infrared sensor cover as the near-infrared sensor cover having the snow melting function by providing the heater portion as described above.

However, in the near-infrared sensor cover described above, since a barrier property of the protective film made of resin is not sufficiently high, there is a concern that moisture in the outside air permeates the protective film, resulting in corrosion of copper and copper damage.

The corrosion of copper is caused by ionization and oxidation of copper due to the moisture in the air that permeates the protective film. The corrosion of copper affects an electrical resistance value of the heater portion, and further, affects the snow melting function. The copper damage is a phenomenon in which copper ions are diffused into resin forming the protective film and bonds between atoms are cut thereby causing oxidation degradation of the resin. When the copper damage occurs, adhesion of the protective film to the heater portion or the like decreases. When the protective film is peeled off, air enters the peeled portion, the transmission property of the near-infrared rays is affected, and further, detection performance of the near-infrared sensor is affected.

Such a problem is not limited to the neat-infrared sensor, and may similarly occur as long as the following electromagnetic wave sensor cover is used. An electromagnetic wave sensor cover is applied to an electromagnetic wave sensor including a transmission unit configured to transmit an electromagnetic wave and a reception unit configured to receive the electromagnetic wave, and includes a cover main body portion that covers the transmission unit and the reception unit from a front side in a transmission direction of the electromagnetic wave from the transmission unit.

SUMMARY

An electromagnetic wave sensor cover for solving the above problems is applied to an electromagnetic wave sensor including a transmission unit configured to transmit an electromagnetic wave and a reception unit configured to receive the electromagnetic wave, and includes a cover main body portion that covers the transmission unit and the reception unit from a front side in a transmission direction of the electromagnetic wave from the transmission unit. The cover main body portion includes a base material formed of a resin material and having a transmission property of the electromagnetic wave from the transmission unit, an undercoat layer formed on a rear surface of the base material in the transmission direction and having the transmission property of the electromagnetic wave from the transmission unit, a heater portion that is formed of copper in a band shape on a rear surface of the undercoat layer in the transmission direction, is configured to generate heat by being energized, and adheres to the base material via the undercoat layer, and an $SiO_2$ coating film having the transmission property of the electromagnetic wave from the transmission unit and covering the heater unit.

According to the above configuration, the $SiO_2$ coating film protects the heater portion and prevents the heater portion from being damaged due to contact with other members. In addition, the $SiO_2$ coating film insulates the heater portion and blocks a current from flowing between the heater portion and other members.

The $SiO_2$ coating film has a barrier property higher than that of the protective film of the related art that is made of resin. Moisture in the air hardly permeates the $SiO_2$ coating film. The moisture is less likely to come into contact with the copper forming the heater portion. Therefore, a phenomenon (corrosion of copper in which copper is ionized and oxidized by contact with moisture is less likely to occur. As a result, an electrical resistance value of the heater portion, and further, a snow melting function is prevented from being affected by corrosion of copper.

As described above, the prevention of the corrosion of copper is implemented by $SiO_2$ which is a metal oxide. In the $SiO_2$ coating film, unlike the protective film made of resin, a phenomenon (copper damage) in which copper ions are diffused into resin and bonds between atoms are cut thereby causing oxidation degradation of the resin does not occur. Therefore, a phenomenon in which the adhesion of the $SiO_2$ coating film to the heater portion or the like decreases, resulting in peeling of the $SiO_2$ coating film is less likely to occur. Air is prevented from entering a peeled portion, the transmission property of the electromagnetic waves, and further detection performance of the electromagnetic wave sensor is prevented from being affected.

In the electromagnetic wave sensor cover described above, the $SiO_2$ coating film covers, in addition to the heater portion, a region of the undercoat layer in which the heater portion is not formed from a rear side in the transmission direction.

According to the above configuration, the region of the undercoat layer in which the heater portion is not formed is also covered with the $SiO_2$ coating film, so that moisture in the air is further less likely to come into contact with copper forming the heater portion as compared with a case where only the heater portion is covered. Therefore, the corrosion of copper and the copper damage are further prevented as compared with the case where only the heater portion is covered.

In the electromagnetic wave sensor cover described above, it is preferable that a reflection suppression layer that prevents reflection of the electromagnetic wave transmitted from the transmission unit is formed behind the $SiO_2$ coating film in the transmission direction.

According to the above configuration, when the reflection suppression layer is irradiated with the electromagnetic wave transmitted from the transmission unit of the electromagnetic wave sensor, the electromagnetic wave is prevented from being reflected. A quantity of the electromagnetic waves transmitting through the cover main body portion increases due to this prevention.

In the electromagnetic wave sensor cover described above, it is preferable that a protective film having the transmission property of the electromagnetic wave from the transmission unit that protects and insulates the heater portion is formed of a resin material between the $SiO_2$ coating film and the reflection suppression layer.

According to the above configuration, the protective film protects the heater portion. Therefore, as compared with a case where the heater portion is protected only by the $SiO_2$ coating film, by adding the protective film, performance of protecting the heater portion is improved, and durability of the heater portion is further improved.

In addition, the protective film insulates the heater portion. Therefore, as compared with a case where the heater portion is insulated only by the $SiO_2$ coating film, by adding the protective film, insulation performance of the heater portion is further improved.

According to the electromagnetic wave sensor cover, it is possible to prevent deterioration of the snow melting function and the detection function which is caused by moisture in the air coming into contact with the heater portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Hereinafter, a first embodiment in which an electromagnetic wave sensor cover is embodied as a near-infrared sensor cover for a vehicle will be described with reference to FIGS. 1 and 2.

Figure 3:
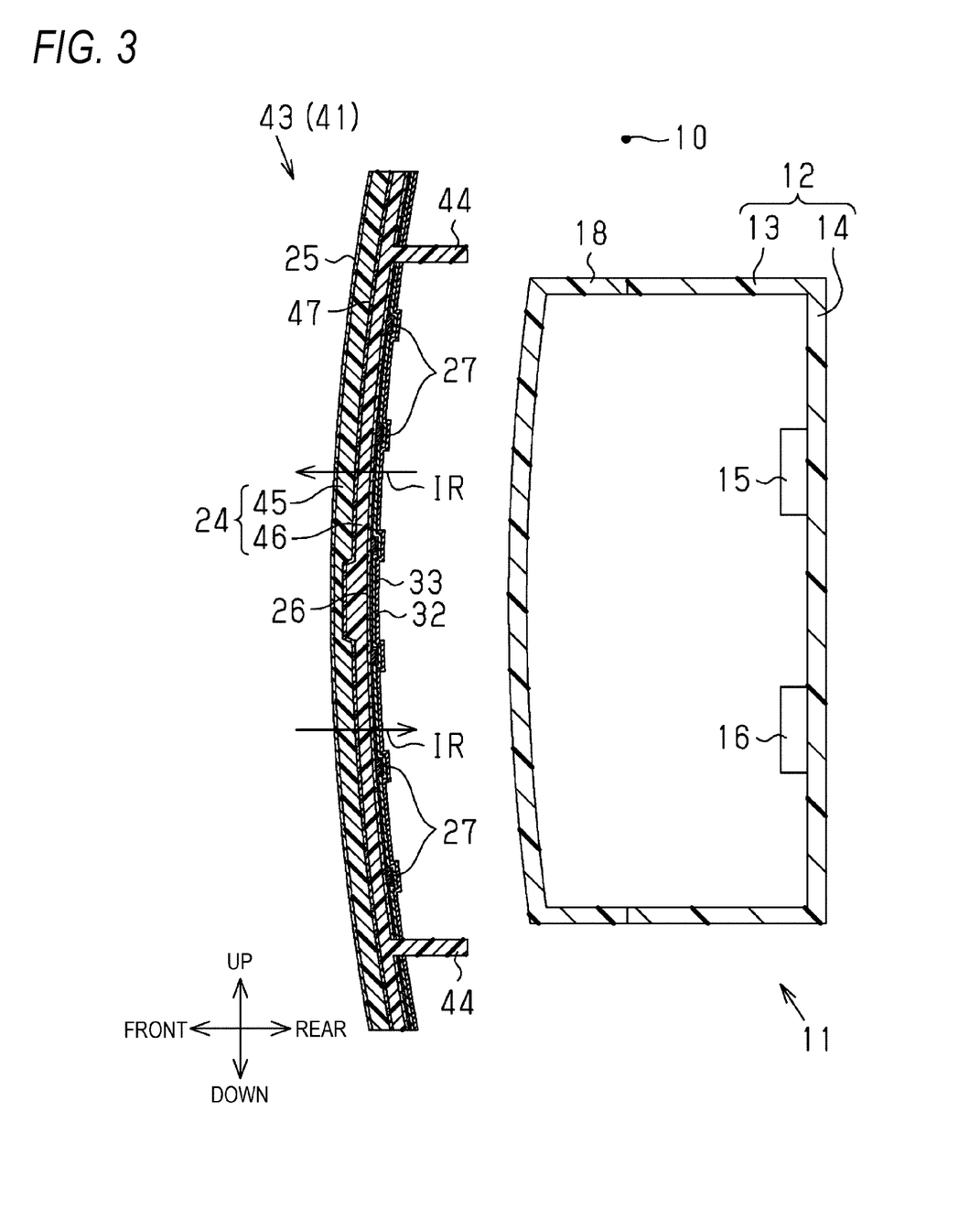
FIG. 3 is a side sectional view showing a near-infrared sensor cover according to a second embodiment together with a near-infrared sensor.
Figure 4:
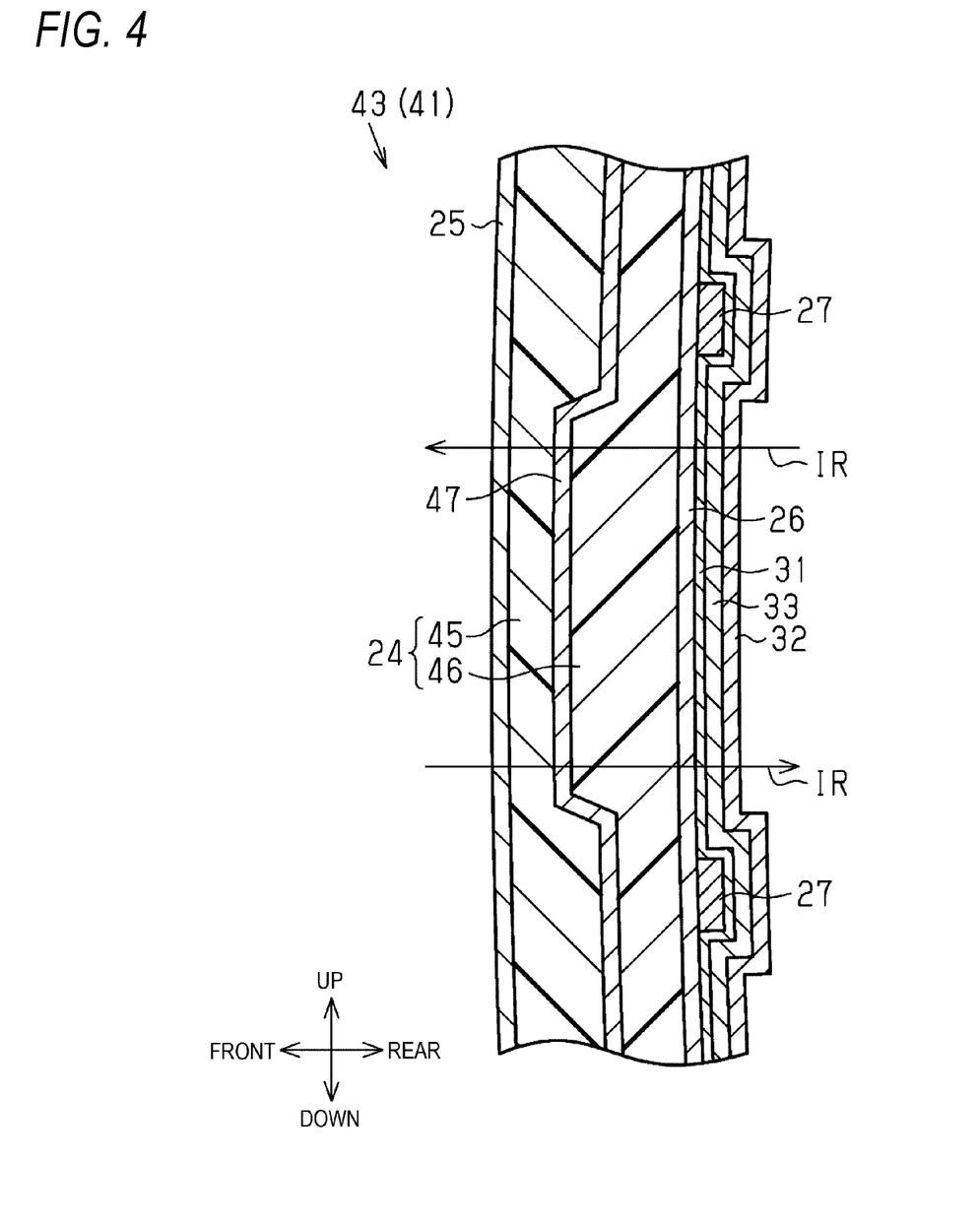
FIG. 4 is a partial side sectional view showing a part of a cover main body portion in FIG. 3 in an enlarged manner.

In the following description, a forward direction of a vehicle is described as a front side, and a rearward direction is described as a rear side. In FIGS. 1 and 2, in order to make each portion of the near-infrared sensor cover recognizable in size, each portion is shown by appropriately changing a scale. This also applies to FIGS. 3 and 4 showing the second embodiment.

Figure 1:
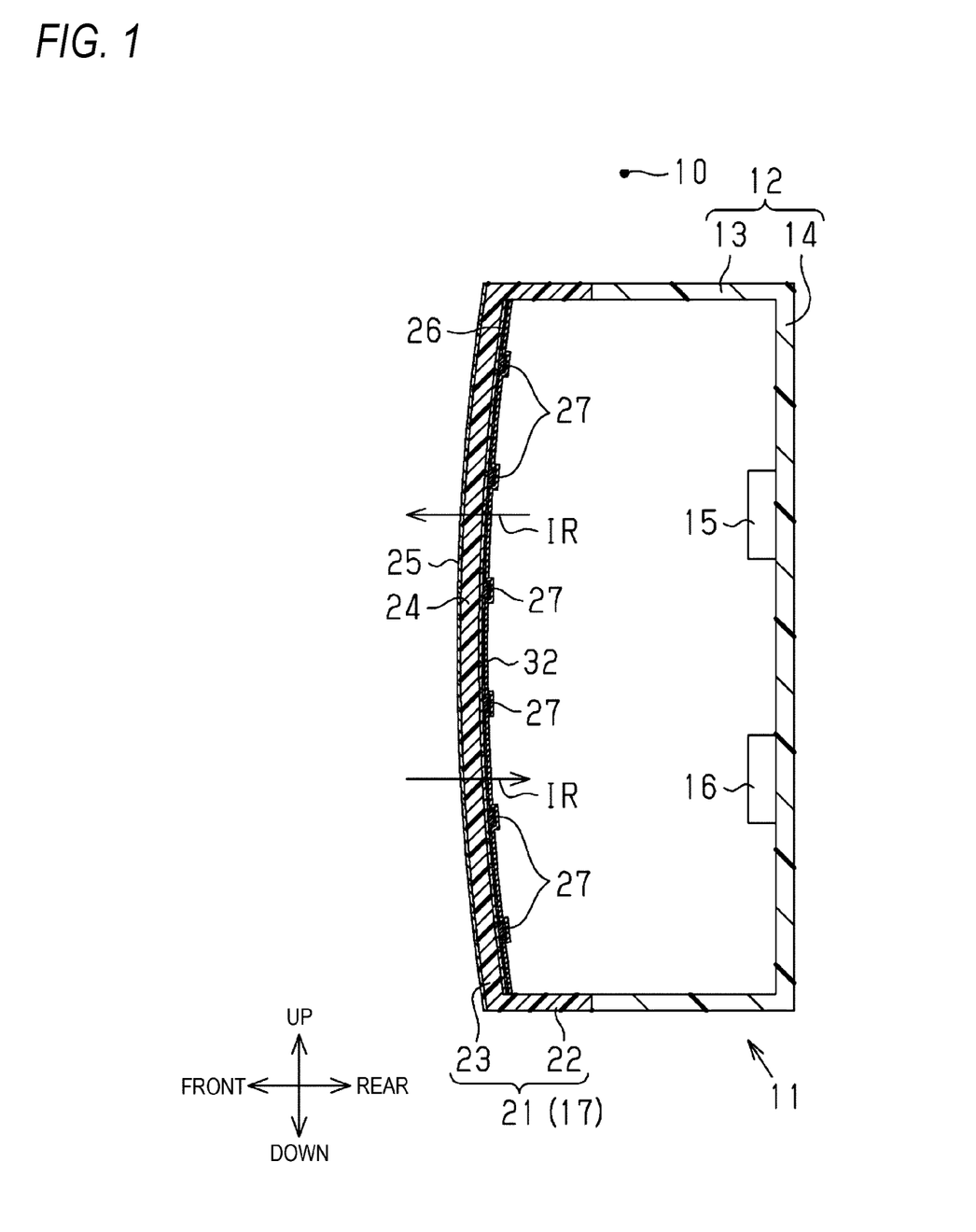
FIG. 1 is a side sectional view of a near-infrared sensor of which a cover is formed of a near-infrared sensor cover according to a first embodiment.

As shown in FIG. 1, a near-infrared sensor 11 for forward monitoring is provided at a front end portion of a vehicle 10. The near infrared sensor 11 transmits near-infrared rays IR having a wavelength of 900 nm or the like toward a front side of the vehicle 10, and receives the near-infrared rays IR reflected by hitting an object outside the vehicle including a preceding vehicle, a pedestrian, and the like.

As described above, since the near-infrared sensor 11 transmits the near-infrared rays IR toward the front side of the vehicle 10, a transmission direction of the near-infrared rays IR transmitted by the near-infrared sensor 11 is a direction from a rear side to the front side of the vehicle 10. A front side in the transmission direction of the near-infrared rays IR substantially coincides with the front side of the vehicle 10, and a rear side in the transmission direction substantially coincides with the rear side of the vehicle 10. Therefore, in the following description, the front side in the transmission direction of the near-infrared rays IR is simply referred to as "front side", "front", or the like, and the rear side in the same transmission direction is simply referred to as "rear side", "rear", or the like.

A rear half portion of an outer shell portion of the near-infrared sensor 11 is constituted by a case 12, and a front half portion thereof is constituted by a cover 17. The case 12 includes a cylindrical peripheral wall portion 13 and a bottom wall portion 14 formed at a rear end portion of the peripheral wall portion 13. The entire case 12 is formed of a resin material such as polybutylene terephthalate (PBT). In the case 12, a transmission unit 15 that transmits the near-infrared rays IR and a reception unit 16 that receives the near-infrared rays IR are disposed on a front side with respect to the bottom wall portion 14.

The cover 17 of the near-infrared sensor 11 is constituted by a near-infrared sensor cover 21. The near-infrared sensor cover 21 includes a cylindrical peripheral wall portion 22 and a plate-shaped cover main body portion 23 formed at a front end portion of the peripheral wall portion 22.

The cover main body portion 23 is formed to have a size that closes a front end portion of the case 12. The cover main body portion 23 covers the transmission unit 15 and the reception unit 16 from the front side.

Figure 2:
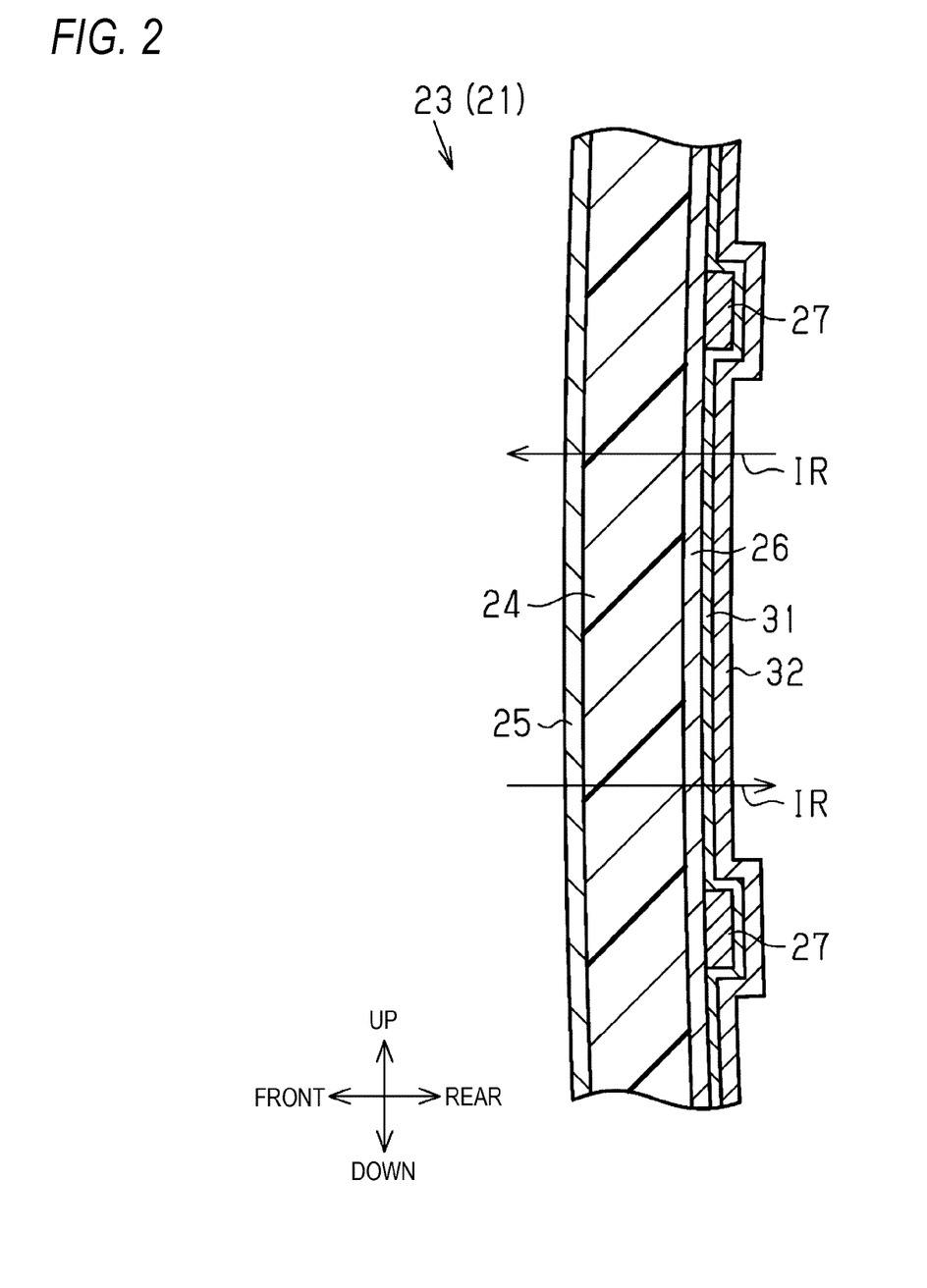
FIG. 2 is a partial side sectional view showing a part of a cover main body portion in FIG. 1 in an enlarged manner.

As shown in FIG. 2, a skeleton portion of the cover main body portion 23 is formed of a base material 24. The base material 24 is formed of a transparent resin material having a transmission property of the near-infrared rays IR. The term "transparent" as used herein includes not only colorless transparent but also colored transparent. The base material 24 is formed of polycarbonate (PC). Besides, the base material 24 may be formed of polymethyl methacrylate (PMMA), cycloolefin polymer (COP), or the like.

On a front surface of the base material 24, a hard coat layer 25 having the transmission property of the near-infrared rays IR and having a hardness higher than that of the base material 24 is laminated. The hard coat layer 25 is formed by applying a known surface treatment agent to the front surface of the base material 24. Examples of the surface treatment agent include organic hard coating agents such as acrylate-based hard coating agents, oxetane-based hard coating agents, and silicone-based hard coating agents, inorganic hard coating agents, and organic-inorganic hybrid hard coating agents. As the hard coating agent, a type of the hard coating agent that is cured by irradiation with ultraviolet rays (UV) may be used, or a type of the hard coating agent that is cured by application of heat may be used.

Heater portions 27 are formed on a rear surface of the base material 24 via an undercoat layer 26. The undercoat layer 26 is a layer for improving adhesion of the heater portions 27 to the base material 24, and is formed of the same material as the hard coat layer 25.

The heater portion 27 is formed of copper in a band shape, and generates heat when being energized. The heater portion 27 is formed by sputtering copper with respect to the undercoat layer 26. The heater portions 27 are wired in a predetermined pattern, for example, in a wiring pattern including a plurality of linear portions extending in parallel to each other and a plurality of connecting portions connecting end portions of adjacent linear portions to each other.

A coating film ($SiO_2$ coating film 31) made of $SiO_2$ (silicon dioxide) is formed on a rear surface and a side surface of the heater portion 27 The heater portions 27 are covered with the $SiO_2$ coating film 31. In the first embodiment, in addition to the heater portions 27, a region of the undercoat layer 26 in which the heater portions 27 are not formed is also covered with the $SiO_2$ coating film 31 from the rear side. The $SiO_2$ coating film 31 has a characteristic that a barrier property is higher than that of a protective film of related art that is made of an acrylic coating film, a urethane-based coating film, or the like. The $SiO_2$ coating film 31 has a film thickness of 50 nm or more.

A reflection suppression layer (also referred to as AR coating) 32 made of a transparent thin film is formed on a rear surface of the $SiO_2$ coating film 31. The reflection suppression layer 32 is formed by performing vacuum deposition, sputtering, WET coating, or the like using a dielectric such as $MgF_2$ (magnesium fluoride).

The reflection suppression layer 32 may be formed of a single-layer thin film or a multi-layer thin film. When the reflection suppression layer 32 is formed of a multi-layer thin film, a multi-layer thin film having different refractive indices or thicknesses may be used. In this manner, reflection of the near-infrared rays IR can be prevented in a wide range of wavelengths.

In addition, as the reflection suppression layer 32, a layer in which metal oxides such as $TiO_2$ (titanium dioxide) and $SiO_2$ are laminated may be used.

Next, an operation of the first embodiment configured as described above will be described. Effects generated by the operation will also be described.

In the vehicle 10 in which the near-infrared sensor 11 is provided, when the near-infrared rays IR are transmitted from the transmission unit 15, a rear surface of the cover main body portion 23 is irradiated with the near-infrared rays IR. At this time, the reflection suppression layer 32 prevents the emitted near-infrared rays IR from being reflected by the rear surface of the cover main body portion 23.

The near-infrared rays IR transmitting through the reflection suppression layer 32 transmits through the $SiO_2$ coating film 31, the undercoat layer 26, the base material 24, and the hard coat layer 25 in this order. As described above, the near-infrared rays IR transmitting through the cover main body portion 23 are reflected by hitting an object including a preceding vehicle, a pedestrian, and the like. The reflected near-infrared rays IR transmit again through the hard coat layer 25, the base material 24, the undercoat layer 26, the $SiO_2$, coating film 31, and the reflection suppression layer 32 in this order in the cover main body portion 23. The near-infrared rays IR transmitting through the cover main body portion 23 are received by the reception unit 16. Based on the transmitted near-infrared rays IR and the received near-infrared rays IR, the near-infrared sensor 11 recognizes the object and detects a distance, a relative speed, and the like, between the vehicle 10 and the object.

As described above, since the reflection of the near-infrared rays IR is prevented by the reflection suppression layer 32, a quantity of the near-infrared rays IR transmitting through the cover main body portion 23 increases. The cover main body portion 23 is less likely to hinder the transmission of the near-infrared rays IR. A quantity of the near-infrared rays IR attenuated by the cover main body portion 23 can be kept within an allowable range. Therefore, the near-infrared sensor 11 easily exhibits the recognition function and the detection function.

Here, the base material 24 is formed of a PC having an SP value (solubility parameter) higher than that of the heater portion 27. The PC and the heater portion 27 are less likely to be compatible with each other, and adhesion therebetween is low. However, in the first embodiment, the undercoat layer 26 is formed between the base material 24 and the heater portion 27. Therefore, the adhesion of the heater portion 27 to the base material 24 is improved by the undercoat layer 26. As compared with a case where the heater portion 27 is formed in direct contact with the base material 24, the heater portion 27 can adhere to the base material 24, and the heater portion 27 peeling off from the base material 24 can be prevented.

In addition, the $SiO_2$ coating film 31 covering the heater portion 27 protects the heater portion 27 and prevents the heater portion 27 from being damaged due to contact with other members. Therefore, durability of the heater portion 27 can be improved as compared with a case where the protection with the $SiO_2$ coating film 31 is not provided.

In addition, the $SiO_2$ coating film 31 insulates the heater portion 27 and blocks a current from flowing between the heater portion 27 and other members.

Further, in the near-infrared sensor cover 21, the hard coat layer 25 improves impact resistance of the cover main body portion 23. Therefore, the hard coat layer 25 can prevent a front surface of the cover main body portion 23 from being damaged by firing stones or the like. In addition, the hard coat layer 25 improves weather resistance of the cover main body portion 23. Therefore, the hard coat layer 25 can prevent the cover main body portion 23 from being altered or deteriorated due to sunlight, wind and rain, temperature change, or the like.

On the other hand, the heater portion 27 generates heat when being energized. A part of the heat is transferred to the front surface of the cover main body portion 23. Therefore, even when snow adheres to the front surface of the cover main body portion 23, the snow is melted by the heat transferred from the heater portion 27. Even during snowfall, it is possible to cause the near-infrared sensor 11 to exhibit the recognition function and the detection function.

The $SiO_2$ coating film 31 has a barrier property higher than that of the protective film of the related art that is made of resin. Moisture in the air hardly permeates the $SiO_2$ coating film 31. The moisture is less likely to come into contact with the copper forming the heater portion 27. Therefore, a phenomenon (corrosion of copper) in which copper is ionized and oxidized by contact with moisture is less likely to occur. As a result, it is possible to prevent an electrical resistance value of the heater portion 27, and further, to prevent a snow melting function from being affected by corrosion of copper.

The above-described effect of preventing moisture from adhering to copper can be obtained by covering at least the heater portion 27 with the $SiO_2$ coating film 31. In the first embodiment, the region of the undercoat layer 26 in which the heater portions 27 are not formed is also covered with the $SiO_2$ coating film 31. As compared with a case where only the heater portions 27 are covered, moisture in the air is further less likely to come into contact with the heater portion 27. Therefore, corrosion of copper and copper damage can be further prevented as compared with the case where only the heater portions 27 are covered.

As described above, the prevention of the corrosion of copper is implemented by $SiO_2$ which is a metal oxide. In the $SiO_2$ coating film 31, unlike the protective film made of resin, a phenomenon (copper damage) in which copper ions are diffused into resin and bonds between atoms are cut thereby causing oxidation degradation of the resin does not occur. Therefore, a phenomenon in which the adhesion of the $SiO_2$, coating film 31 to the heater portion 27 or the like decreases, resulting in peeling of the $SiO_2$ coating film 31 is less likely to occur. It is possible to prevent the air from entering a peeled portion and to prevent the transmission property of the near-infrared rays IR, and further to prevent detection performance of the near-infrared sensor 11 from being affected.

Second Embodiment

Next, a second embodiment in which an electromagnetic wave sensor cover is embodied as a near-infrared sensor cover will be described with reference to FIGS. 3 and 4.

In the second embodiment, as shown in FIG. 3, a near-infrared sensor cover 41 is provided separately from the near-infrared sensor 11. More specifically, the near-infrared sensor 11 is constituted by a case 12 to which the transmission unit 15 and the reception unit 16 are assembled, and a cover 18 that is disposed in front of the case 12 and covers the transmission unit 15 and the reception unit 16 from the front side. The cover 18 is formed of PC, PMMA, COP, resin glass, or the like, and has the transmission property of the near-infrared rays.

The near-infrared sensor cover 41 includes a plate-shaped cover main body portion 43 and attachment portions 44 protruding from a rear surface of the cover main body portion 43 toward the rear side. The cover main body portion 43 is located in front of the cover 18 and indirectly covers the transmission unit 15 and the reception unit 16 from the front side via the cover 18. The near-infrared sensor cover 41 is fixed to the vehicle 10 by the attachment portions 44.

Similarly to the cover 17 of the near-infrared sensor 11 in the first embodiment, the near-infrared sensor cover 41 has a function of covering the transmission unit 15 and the reception unit 16 from the front side, and also has a function as a garnish for decorating a front portion of the vehicle 10.

Therefore, similarly to the first embodiment as shown in FIG. 4, the near-infrared sensor cover 41 according to the second embodiment includes the hard coat layer 25, the base material 24, the undercoat layer 26, the heater portion 27, the $SiO_2$ coating film 31, and the reflection suppression layer 32.

The configuration of the near-infrared sensor cover 41 is different from the configuration of the near-infrared sensor cover 21 in the following points.

The base material 24 is divided into a front base material 45 constituting a front portion of the base material 24 and a rear base material 46 constituting a rear portion of the base material 24.

A decorative layer 47 is provided between the front base material 45 and the rear base material 46.

A protective film 33 having the transmission property of the near-infrared rays IR that protects and insulates the heater portion 27 is formed of a resin material between the $SiO_2$ coating film 31 and the reflection suppression layer 32.

The front base material 45 and the rear base material 46 are formed of the same resin material as that of the base material 24 in the first embodiment, and have the transmission property of the near-infrared rays IR. A rear surface of the front base material 45 has a concave-convex shape. A front surface of the rear base material 46 is formed in a convex-concave shape which is a shape matching the rear surface of the front base material 45.

The decorative layer 47 is a layer for decorating the near-infrared sensor cover 41. The decorative layer 47 is formed of a material having a high transmittance of the near-infrared rays IR and a low transmittance of visible light. For example, the decorative layer 47 may be formed of a colored decorative layer having a dark color such as black or blue. The decorative layer 47 may be formed of a bright decorative layer made of a metal material such as indium (In) and having metallic luster. Further, the decorative layer 47 may be formed of a combination of the colored decorative layer and the bright decorative layer. The decorative layer 47 is formed in a shape matching to the rear surface of the front base material 45 and the front surface of the rear base material 46, thereby having a concave-convex shape.

The protective film 33 is formed by applying a coating material such as an acrylic coating material or a urethane-based coating material to the entire rear surface of the $SiO_2$ coating film 31 and curing the coating material by irradiating the coating material with ultraviolet rays or by applying heat to the coating material.

The configuration other than the above is the same as that of the first embodiment. Therefore, in the second embodiment, the same components as those described in the first embodiment are denoted by the same reference numerals, and a repeated description thereof will be omitted.

In the second embodiment, when the near-infrared rays IR are transmitted from the transmission unit 15, the near-infrared rays IR transmit through the reflection suppression layer 32, the protective film 33, the $SiO_2$ coating film 31, the undercoat layer 26, the rear base material 46, the decorative layer 47, the front base material 45, and the hard coat layer 25 in this order in the cover main body portion 43.

The near-infrared rays IR reflected by hitting an object outside the vehicle transmit again through the hard coat layer 25, the front base material 45, the decorative layer 47, the rear base material 46, the undercoat layer 26, the $SiO_2$ coating film 31, the protective film 33, and the reflection suppression layer 32 in this order in the cover main body portion 43. The near-infrared rays IR transmitting through the cover main body portion 43 are received by the reception unit 16.

Accordingly, also in the second embodiment, similar operations and effects to those of the first embodiment are obtained. In addition, in the second embodiment, the following operations and effects are obtained.

- When the cover main body portion 43 is irradiated with visible light from the front side, the visible light transmits through the hard coat layer 25 and the front base material 45, and is reflected by the decorative layer 47. When the near-infrared sensor cover 41 is viewed from the front side of the vehicle, it appears that the decorative layer 47 is located behind the front base material 45 through the hard coat layer 25 and the front base material 45. In this way, the near-infrared sensor cover 41 is decorated by the decorative layer 47, and appearance quality of the near-infrared sensor cover 41 and a peripheral portion thereof is improved.

- In particular, the decorative layer 47 is formed in the concave-convex shape so as to match the shape of the rear surface of the front base material 45 and the shape of the front surface of the rear base material 46. Therefore, the decorative layer 47 is seen stereoscopically from the front side of the vehicle 10. The appearance quality of the near-infrared sensor cover 41 and a peripheral portion thereof is further improved.

- The visible light is reflected by the decorative layer 47 in front of the near-infrared sensor 11. The decorative layer 47 exhibits a function of covering or hiding the near-infrared sensor 11. Therefore, it is difficult to see the near-infrared sensor 11 from a front side of the near-infrared sensor cover 41. Therefore, design is improved as compared with a case where the near-infrared sensor 11 is seen through the near-infrared sensor cover 41.

- By adding the protective film 33 made of resin, the following effects can be obtained.

The protective film 33 protects the heater portion 27. Therefore, as compared with the case where the heater portion 27 is protected only by the $SiO_2$ coating film 31, by adding the protective film 33, performance of protecting the heater portion 27 is improved, and the durability of the heater portion 27 can be further improved.

In addition, the protective film 33 insulates the heater portion 27. Therefore, as compared with the case where the heater portion 27 is insulated only by the $SiO_2$ coating film 31, by adding the protective film 33, insulation performance of the heater portion 27 can be further improved.

The above embodiments can also be implemented as modifications which are modified as follows. The above embodiments and the following modifications can be implemented in combination with each other within a technically consistent range.

<For Cover Main Body Portions 23, 43>

- The $SiO_2$ coating film 31 may cover at least the heater portion 27. Therefore, the formation of the $SiO_2$ coating film 31 in the region of the undercoat layer 26 in which the heater portions 27 are not formed may be omitted.

- The hard coat layer 25 may be formed of a hard coat film having a hardness higher than that of the base material 24. As the hard coat film, a film formed by applying the surface treatment agent on a film base material made of a transparent resin material such as PC or PMMA can be used.

- The configuration of the base material in the near-infrared sensor cover 21 of the first embodiment functioning as the cover 17 of the near-infrared sensor 11 may be applied to the configuration of the base material in the near-infrared sensor cover 41 of the second embodiment that is provided separately from the near-infrared sensor 11. Further, the configuration of the base material in the near-infrared sensor cover 41 of the second embodiment may be applied to the configuration of the base material in the near-infrared sensor cover 21 of the first embodiment.

- The protective film 33 in the second embodiment may be omitted. In the first embodiment, the protective film 33 made of the same resin as in the second embodiment may be formed between the $SiO_2$ coating film 31 and the reflection suppression layer 32.

- At least one of the hard coat layer 25 and the reflection suppression layer 32 in the cover main body portions 23, 43 may be omitted as appropriate.

- A visible light cut pigment may be blended in the rear base material 46 in the second embodiment. In addition, when a black pressing coating film is formed on the rear surface of the decorative layer 47, the visible light cut pigment may be blended in the black pressing coating film.

<For Application Target of Electromagnetic Wave Sensor Cover>

- The near-infrared sensor 11 in which the transmission unit 15 and the reception unit 16 are covered with the near-infrared sensor covers 21, 41 may transmit and receive the near-infrared rays IR having a wavelength of, for example, 1550 nm, in addition to the near-infrared rays IR having the wavelength of 900 nm.

- In the second embodiment, a pressing coating film may be provided instead of the rear base material 46.

- The electromagnetic wave sensor cover can be applied regardless of a type of an electromagnetic wave sensor as long as the electromagnetic wave sensor cover includes a cover main body portion that covers a transmission unit and a reception unit of the electromagnetic wave sensor from a front side in a transmission direction of electromagnetic waves from the transmission unit. The electromagnetic wave sensor may transmit and receive, for example, millimeter waves as the electromagnetic waves instead of the near-infrared rays.

- The electromagnetic wave sensor cover can also be applied when the electromagnetic wave sensor is provided at a position different from the front portion of the vehicle 10, for example, at a rear portion of the vehicle 10. In this case, the electromagnetic wave sensor transmits the electromagnetic waves toward a rear side of the vehicle 10. The electromagnetic wave sensor cover is disposed in front of the transmission unit 15 and the reception unit 16 in the transmission direction of the electromagnetic waves, that is, at a position of the rear side the vehicle 10 with respect to the transmission unit 15 and the reception unit 16.

Similarly, the electromagnetic wave sensor cover described above can also be applied when the electromagnetic wave sensor is provided at an oblique front side portion or an oblique rear side portion of the vehicle 10.

The electromagnetic wave sensor cover can also be applied when the electromagnetic wave sensor is mounted on a vehicle of which a type is different from that of the vehicle 10, for example, a vehicle such as a train, an aircraft, or a ship.

The near-infrared sensor cover 41 of the second embodiment may be embodied as an exterior product for a vehicle having a function of decorating the vehicle 10, such as an emblem, an ornament, or a mark.

What is claimed is:

1. An electromagnetic wave sensor cover, applied to an electromagnetic wave sensor including a transmission unit configured to transmit an electromagnetic wave and a reception unit configured to receive the electromagnetic wave, the electromagnetic wave sensor cover comprising
    a cover main body portion that covers the transmission unit and the reception unit from a front side in a transmission direction of the electromagnetic wave from the transmission unit,
    wherein the cover main body portion includes
        a base material formed of a resin material and having a transmission property of the electromagnetic wave from the transmission unit,
        an undercoat layer formed on a rear surface of the base material in the transmission direction and having the transmission property of the electromagnetic wave from the transmission unit,
        a heater portion that is formed of copper in a band shape on a rear surface of the undercoat layer in the transmission direction, is configured to generate heat by being energized, and adheres to the base material via the undercoat layer, and
        a $SiO_2$ coating film having the transmission property of the electromagnetic wave from the transmission unit and covering the heater portion,
    wherein a reflection suppression layer that prevents reflection of the electromagnetic wave transmitted from the transmission unit is formed behind the $SiO_2$ coating film in the transmission direction.

2. The electromagnetic wave sensor cover according to claim 1,
    wherein the $SiO_2$ coating film covers, in addition to the heater portion, a region of the undercoat layer in which the heater portion is not formed from a rear side in the transmission direction.

3. The electromagnetic wave sensor cover according to claim 1,
    wherein a protective film having the transmission property of the electromagnetic wave from the transmission unit that protects and insulates the heater portion is formed of a resin material between the $SiO_2$ coating film and the reflection suppression layer.

* * * * *